(12) United States Patent
Zilbershtein et al.

(10) Patent No.: US 7,774,438 B2
(45) Date of Patent: Aug. 10, 2010

(54) PARAMETER PROVISIONING

(75) Inventors: Itai Ephraim Zilbershtein, Hod-Hasharon (IL); Dan Gluskin, Tel-Aviv (IL); Pesah Spector, Kochav Yair (IL)

(73) Assignee: Avaya Communication Israel Ltd., Tel Aviv (IL)

( * ) Notice: Subject to any disclaimer, the term of this patent is extended or adjusted under 35 U.S.C. 154(b) by 466 days.

(21) Appl. No.: 11/627,498

(22) Filed: Jan. 26, 2007

(65) Prior Publication Data

US 2008/0183848 A1 Jul. 31, 2008

(51) Int. Cl.
G06F 15/177 (2006.01)
(52) U.S. Cl. .................. 709/220; 709/222; 709/226; 709/216; 709/224; 709/223; 370/230; 370/401; 370/463; 370/235; 702/184; 702/182; 702/185; 701/1; 701/99; 701/50
(58) Field of Classification Search ......... 709/220–229, 709/216, 232
See application file for complete search history.

(56) References Cited

U.S. PATENT DOCUMENTS

| | | | |
|---|---|---|---|
| 5,598,536 A | 1/1997 | Slaughter, III et al. | |
| 6,212,563 B1 | 4/2001 | Beser | |
| 6,775,273 B1 | 8/2004 | Kung et al. | |
| 6,807,184 B2 | 10/2004 | Gutknecht et al. | |
| 6,957,276 B1 | 10/2005 | Bahl | |
| 6,958,996 B2 | 10/2005 | Xiong | |
| 7,046,659 B1 | 5/2006 | Woundy | |
| 7,096,273 B1 | 8/2006 | Meier | |
| 7,107,326 B1 | 9/2006 | Fijolek et al. | |
| 7,152,117 B1 * | 12/2006 | Stapp et al. ................. | 709/245 |
| 2003/0147395 A1 * | 8/2003 | Gutknecht et al. .......... | 370/393 |
| 2004/0153550 A1 | 8/2004 | Payeur | |
| 2006/0067350 A1 | 3/2006 | Clevy et al. | |
| 2006/0109847 A1 | 5/2006 | Satou | |
| 2006/0133332 A1 | 6/2006 | Achanta | |
| 2006/0220850 A1 * | 10/2006 | Bowser et al. .......... | 340/568.1 |
| 2007/0002761 A1 * | 1/2007 | Diamant et al. ............ | 370/252 |
| 2009/0245168 A1 * | 10/2009 | Soderstrom ................ | 370/328 |

FOREIGN PATENT DOCUMENTS

EP 08150594 7/2008

OTHER PUBLICATIONS

Cablelabs: "Cablelabs' DHCP Options Registry," CableLabs® Specifications, CL-SP-CANN-DHCP-Reg-I01-070119, Jan. 2007, pp. 1-31.
S. Alexander et al., "DHCP Options and BOOTP Vendor Extensions," IETF Request for Comments: 2132, Mar. 1997, pp. 1-34.
Lebas, Y., "EP Application No. 08150594.3 Office Action Jan. 28, 2009", , Publisher: EPO, Published in: EP.
Lebas, Yves, "EP Application No. 08150594.3 Office Action Jul. 30, 2008", , Publisher: EPO, Published in: EP.

* cited by examiner

*Primary Examiner*—Jude J Jean Gilles
(74) *Attorney, Agent, or Firm*—Joseph B. Ryan; Jason Paul DeMont; Wayne S. Breyer (57) ABSTRACT

A method of self-configuring a network device. The method includes transmitting non-unique structure information of a network device, from the network device to a configuration server, receiving, by the network device from the configuration server, one or more configuration parameter values responsive to the transmitted structure information and configuring the network device with the configuration parameter values.

27 Claims, 3 Drawing Sheets

PARAMETER PROVISIONING

FIELD OF THE INVENTION

The present invention relates to communication apparatus and particularly to methods of assigning parameters to devices.

BACKGROUND OF THE INVENTION

The dynamic host configuration protocol (DHCP), described in RFC 2131, the disclosure of which is incorporated herein by reference, is used to automatically assign IP addresses and other parameters to network devices, such as computers, routers, gateways, servers, local branch boxes and other processing units connected to a network. The automatic assigning of IP addresses avoids the need of a skilled person to configure the network device with the address. The use of DHCP is described, for example, in U.S. Pat. No. 7,096,273 to Meier, the disclosure of which is incorporated herein by reference.

DHCP may be used to provide an arbitrary IP address which changes over time. It may, however, be desired that a device have an IP address that does not change over time.

U.S. Pat. No. 6,807,184 to Gutknecht et al., the disclosure of which is incorporated herein by reference, describes a DHCP server which keeps track of MAC addresses and/or PC hostnames of devices to which it assigns IP addresses and the IP addresses assigned to the devices. Further requests for IP addresses are assigned the same IP addresses.

U.S. Pat. No. 6,957,276 to Bahl, the disclosure of which is incorporated herein by reference, similarly describes methods for reclaiming a previously assigned IP address.

In some cases, however, it is desired that devices be configured with a static IP address pre-planned for the network device.

U.S. Pat. No. 6,775,273 to Kung et al., the disclosure of which is incorporated herein by reference, describes assignment of an IP address to a device based on the MAC address of the device.

U.S. Pat. No. 6,212,563 to Beser, the disclosure of which is incorporated herein by reference, describes use of DHCP with a preconfigured client ID, to assign a static IP address.

These two patents, however, require knowledge in advance of the MAC address or the client ID of the device. Such knowledge requires either configuring the device with a desired value, an act which requires a trained person in the site of the device or on its way to the site, or marking an attribute of the device for further use.

In addition to assigning IP addresses, DHCP is used to provide devices with operation parameters. The parameters may be configured into the DHCP server according to the hardware address of the device, the IP address of the device or any other unique identifier of the device. In addition, parameters, such as the addresses of peripherals and/or default values of QoS or other fields of packets they transmit, may be defined for groups of devices, such as all devices of a specific vendor and/or all devices in a specific network.

U.S. patent publication 2006/0133332 to Achanta, the disclosure of which is incorporated herein by reference, describes assigning parameters to mobile access points using DHCP.

U.S. patent publication 2004/0153550 to Payeur, the disclosure of which is incorporated herein by reference, describes a method of customization of DHCP option rules.

SUMMARY OF THE INVENTION

An aspect of some embodiments of the present invention relates to assigning a network address (e.g., an IP address) and/or other configuration parameters by a configuration server to a client device using a configuration protocol, based on non-unique information on the structure of the device, provided by the client device to the server. The structure information of the device may include, for example, the manufacturer's model number for the device, the arrangement of the sub-modules of the device and/or software packages carried by the device. Optionally, the structure information and the corresponding parameter values to be configured are set by a system administrator into the server.

While the structure information of the device is not unique, it is generally sufficient to differentiate between devices in a single local area network (LAN), which is sufficient since the LAN location is available to the configuration protocol server and differentiates between same hardware in different locations. The structure information is convenient information to be used for configuration, since it is generally known to the system administrator setting the parameters in the server (in contrast to the MAC address, which is generally less available) and is also automatically self-detectable by the client device.

When two or more devices are to have the same structure in the same LAN, the system administrator may purposely acquire devices with an unimportant difference, such as a different arrangement of sub-models. Alternatively, the identical devices may be supplied to their installation site at different times, such that each time one of the devices is installed, it is the only device of that structure that is expected by the configuration server. In accordance with this alternative, the configuration server is configured at any time for only a single one of the identical devices. Once one of the identical devices is assigned an address or other unique client ID it always uses that address for its configuration and does not again request configuration information anonymously. The system administrator then configures the configuration server with an address for another one of the identical devices.

In some embodiments of the invention, in requesting a network address by the client device, the client device adds a field with its structure description and the server assigns the network address responsive to this structure description. In other embodiments of the invention, the client only indicates that it is interested in structure based configuration, and responsive to the indication receives a list of structures from which it selects its structure or a most similar structure.

An aspect of some embodiments of the present invention relates to a method of assigning a network address or operation parameters to a client device using a configuration protocol, in which the client device selects the network address or a key to the network address, from a list of a plurality of keys or addresses. Optionally, the list is provided to the client device by a configuration protocol server during a configuration process.

In some embodiments of the invention, the client device is provided with a correlation list of hardware configurations from which the device selects its configuration (or a closest configuration). Responsive to the hardware configuration selected by the client device, the server assigns an IP address configured into the server for that hardware configuration.

An aspect of some embodiments of the present invention relates to a two stage method of assigning a pre-designated network address to a client device using a configuration protocol. In a first stage, the client device is assigned an arbitrary or random network address together with a client ID to be used in the second stage for requesting the pre-designated network address. In the second stage, the client device is assigned the pre-designated network address based on the client ID.

The two stages are optionally performed within a short period, for example within less than an hour, less than five minutes, or even less than 30 seconds or less than 10 seconds.

There is therefore provided in accordance with an exemplary embodiment of the invention, a method of self-configuring a network device, comprising transmitting non-unique structure information of a network device, from the network device to a configuration server, receiving, by the network device from the configuration server, one or more configuration parameter values responsive to the transmitted structure information and configuring the network device with the configuration parameter values.

Optionally, receiving the one or more configuration parameters comprises receiving a network address to be used as the network address of the network device. Optionally, receiving the one or more configuration parameters comprises receiving an IP address. Optionally, the structure information comprises a model number of the device or a sub-module thereof. Optionally, the structure information comprises a type or model number of a sub-module in a specific slot of the device. Optionally, transmitting the non-unique structure information comprises receiving a list of structure descriptions of devices and transmitting an indication of a matching entry of the list. Optionally, each entry of the list includes a corresponding client identification uniquely identifying one or more corresponding configuration parameter values and/or at least one parameter in addition to the structure description and the corresponding client identification. Optionally, receiving the list of structure descriptions comprises receiving from the configuration server. Optionally, receiving the one or more configuration parameter values comprises receiving in a transmission according to the dynamic host configuration protocol DHCP.

There is further provided in accordance with an exemplary embodiment of the invention, a method of providing one or more configuration parameter values to a network device, by a configuration server, comprising receiving non-unique information on the structure of a network device, determining one or more configuration parameter values responsive to the received non-unique information and transmitting the one or more determined configuration parameter values to the network device.

Optionally, receiving the non-unique information comprises transmitting a list of structure information entries to the network device and receiving an indication of one of the entries. Optionally, determining the one or more parameter values comprises determining an IP address, which is globally unique. Optionally, transmitting the one or more parameter values comprises transmitting in a DHCP packet.

There is further provided in accordance with an exemplary embodiment of the invention, a method of adding devices to a network, comprising acquiring a plurality of devices of identical structure except for a different arrangement of sub-modules, so that the devices have different structure information, employing the acquired devices in a single local area network; and configuring each of the devices with a different set of parameters using any of the methods discussed hereinabove.

There is further provided in accordance with an exemplary embodiment of the invention, a configuration server, comprising an input interface adapted to receive packets in accordance with a configuration protocol and a processor configured to determine from a packet received by the input interface non-unique information on the structure of a network device, to determine one or more configuration parameter values for the network device responsive to the structure information and to generate a configuration protocol packet including the one or more parameter values, for transmission to the network device.

Optionally, the input interface is adapted to receive packets according to the dynamic host configuration protocol.

There is further provided in accordance with an exemplary embodiment of the invention, a network device, comprising a network interface adapted to transmit and receive packets of a configuration protocol, a structure unit adapted to generate an indication of the structure of the network device, which indication does not uniquely identify the network device, for transmission to a configuration server, responsive to a received configuration protocol packet received through the network interface and a configuration unit adapted to receive packets in accordance with a configuration protocol including one or more configuration parameter values and configure the network device responsive to the received packet.

Optionally, the structure unit is adapted to select a single entry from a list of device structure descriptions and generate an indication of the selected entry.

There is further provided in accordance with an exemplary embodiment of the invention, a method of self-configuring a network device by the network device, comprising receiving a list of a plurality of device descriptions, selecting from the list a single entry, transmitting a configuration request to a configuration server with an indication of the selected entry, receiving at least one configuration parameter value responsive to the transmitted indication; and configuring the network device with the received parameter value.

Optionally, receiving the list comprises receiving in a configuration protocol packet. Optionally, transmitting the configuration request comprises transmitting within less than an hour from receiving the list. Optionally, receiving the list comprises receiving from the configuration server to which the configuration request is transmitted. Optionally, receiving the configuration parameter value comprises receiving an address and wherein configuring the network device comprises configuring the received address for use as a source address of the device. Optionally, receiving the list comprises receiving a list in which each entry includes a non-unique structure description of a device and/or a location indication.

Optionally, selecting a single entry comprises selecting an entry whose device description best matches the self configuring network device, even if not completely matching.

There is further provided in accordance with an exemplary embodiment of the invention, a network device, comprising a network interface adapted to transmit and receive packets according to a configuration protocol and a processor adapted to extract from a configuration protocol packet received through the network interface, a list of a plurality of device descriptions, to select a single description and to transmit a configuration protocol packet requesting a configuration parameter at least partly matching the selected description. Optionally, the device includes a human interface adapted to receive information on the device to be compared to the list, from a human operator.

Possibly, the human interface is adapted to receive location information of the device. Optionally, the configuration protocol comprises DHCP.

There is further provided in accordance with an exemplary embodiment of the invention, a method of self-configuring a network device, comprising transmitting a first request for a network address in a configuration protocol packet, receiving a first response including a first network address assigned to the network device and additional information, responsive to the first request, transmitting a second request for a specific network address using at least some of the additional information from the first response and receiving a second response including the specific second network address, responsive to the second request.

Optionally, the network device does not use the first network address for transmission of packets beyond configuration protocol packets. Optionally, the method includes transmitting data packets using the second network address in a source address field of the data packets. Optionally, the method includes transmitting a configuration protocol packet releasing the first network address before transmitting the second request.

Optionally, the second request is transmitted within less than 10 minutes from receiving the first response or even less than 30 seconds from receiving the first response. Optionally, receiving the additional information comprises receiving a client ID uniquely associated with the specific network address. Optionally, receiving the additional information comprises receiving a list of a plurality of client IDs from which a single client ID is selected to identify the network device. Optionally, the list of the plurality of client IDs comprises for each client ID a respective device description and wherein transmitting the second request comprises transmitting with a client ID whose respective device description best matches the network device.

Optionally, transmitting the first request comprises transmitting a DHCP request. Possibly, transmitting the DHCP request comprises transmitting with a vendor ID invoking transmission of the additional information by a DHCP server. In some embodiments of the invention, transmitting a second request for a specific network address comprises transmitting a request for a static address.

There is further provided in accordance with an exemplary embodiment of the invention, a network device, comprising a network interface adapted to transmit and receive packets according to a configuration protocol and a processor adapted to transmit a request for a network address in a configuration protocol packet, to extract from a response to the request a client ID and to transmit a second request for a specific network address corresponding to the client ID. Optionally, the processor is adapted to extract the client ID from an optional vendor field of the response. Optionally, the configuration protocol comprises DHCP.

There is further provided in accordance with an exemplary embodiment of the invention, a configuration server, comprising a network interface adapted to transmit and receive packets according to a configuration protocol, a memory storing a table which correlates between client IDs and specific IP addresses and a processor adapted to receive requests for a network address in a configuration protocol packet and to transmit responsive to at least some of the received requests a response including a client ID from the table.

Optionally, the processor is adapted to select the client ID to be transmitted responsive to a vendor ID received in a request from a client. Optionally, the processor is adapted to place the client ID in the response in a field not meant for the client ID in the configuration protocol.

BRIEF DESCRIPTION OF THE DRAWINGS

The present invention will now be described in the following detailed description of exemplary embodiments of the invention and with reference to the attached drawings, in which same or similar number designations are maintained throughout the figures for each element and in which dimensions of components and features shown in the figures are chosen for convenience and clarity of presentation and are not necessarily shown to scale. Generally, only structures, elements or parts that are germane to the discussion are shown in the figures. The figures are listed below.

DETAILED DESCRIPTION OF SOME EMBODIMENTS

Figure 1:
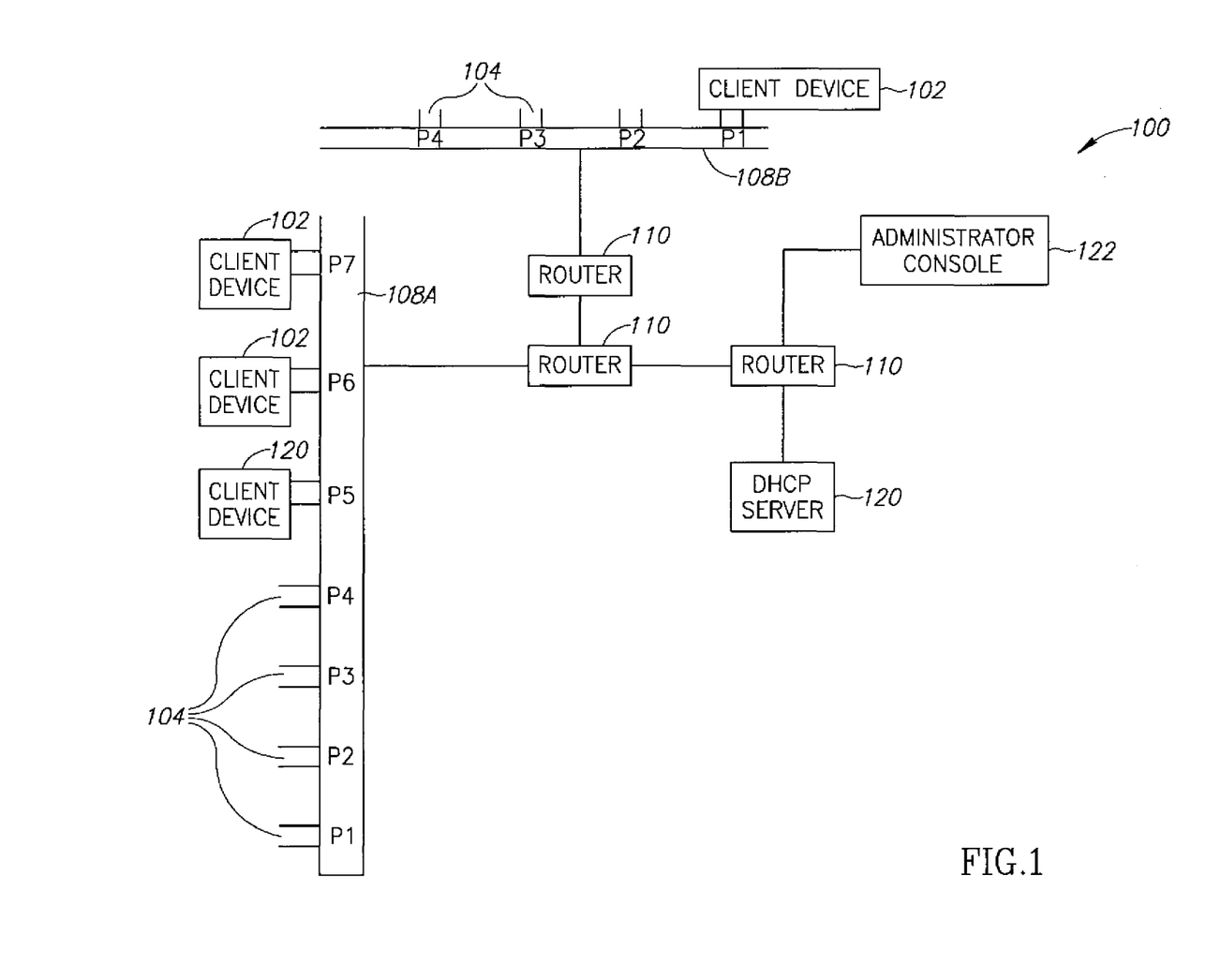
FIG. 1 is a schematic illustration of a communication network, useful in explaining an exemplary embodiment of the invention.

FIG. 1 is a schematic illustration of a communication network 100, useful in explaining an exemplary, but not limiting, embodiment of the invention. Network 100 comprises a plurality of client devices 102 which are connected through local area networks (LANs) 108 (marked 108A and 108B) and/or routers 110 to a DHCP server 120. One or more of routers 110 optionally operate as DHCP relay units. DHCP server 120 provides client devices 102 with IP addresses and configuration parameter values, such as a default TTL to be used in TCP/IP packets, password parameters and time out durations. An administrator console 122 is used by a system administrator to control network 100, including controlling DHCP server 120. Alternatively or additionally to a central DHCP server 120, some or all of LANs 108 may have a local DHCP server connected directly to the LAN.

LANs 108 may be located near to each other or distanced from each other. LANs 108 may be in locations distanced from administrator console 122 by hundreds or even thousands of kilometers, such that it is preferable that an administrator is not required to be at the locations of LANs 108 or handle client devices 102 before they are supplied to their locations.

For illustration purposes, FIG. 1 shows a LAN 108 having a plurality of ports 104 (named (P1-P7), which are adapted to receive client devices 102, for expanding the capabilities of network 100. In FIG. 1, ports P1-P4 are empty, while ports P5 to P7 are occupied.

Client devices 102 may be substantially any device requiring an IP address, such as routers, switches, personal computers, gateways, servers, dedicated apparatus, processing cards and communication equipment.

Figure 2:
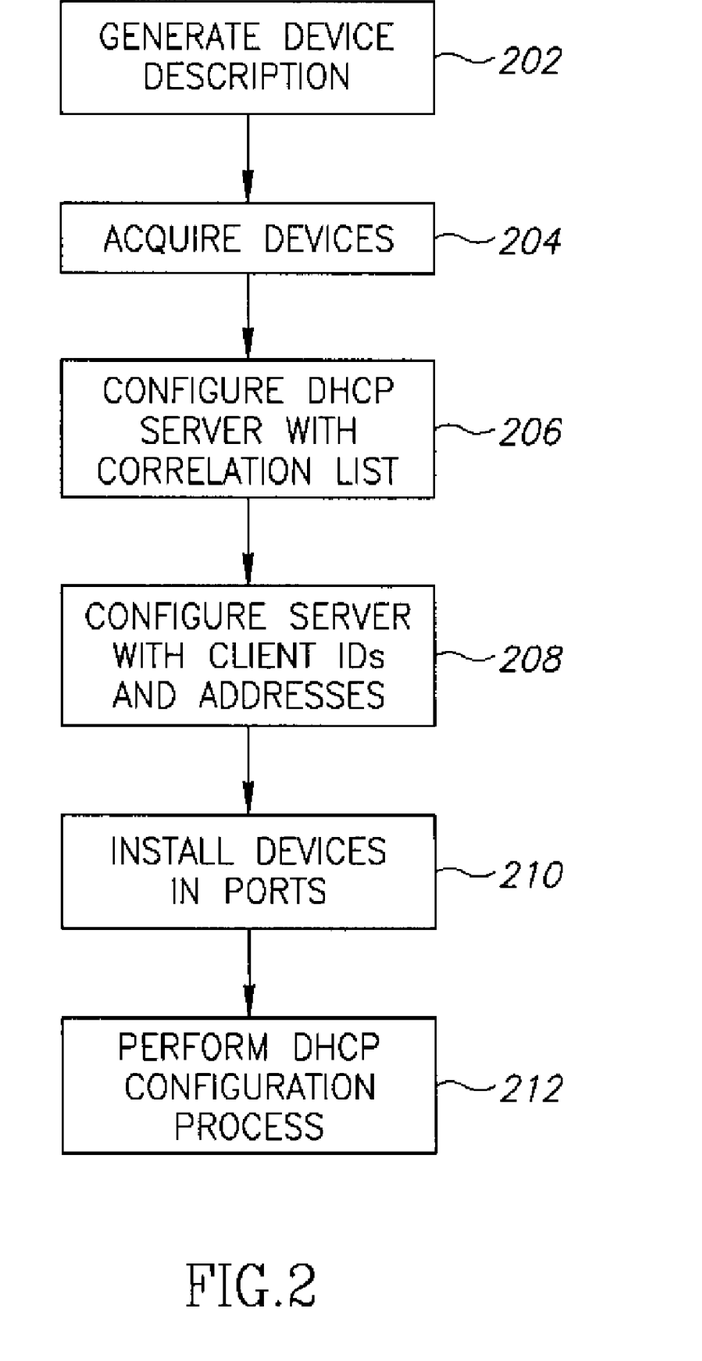
FIG. 2 is a flowchart of a procedure of adding client devices to a network, in accordance with an exemplary embodiment of the invention.

FIG. 2 is a flowchart of a procedure of adding client devices 102 into ports 104, in accordance with an exemplary embodiment of the invention. When a need for additional client devices 102 arises, the administrator generates (202) respective descriptions of the structures of the client devices 102 that are to be installed. The devices 102 are acquired (204) according to the generated descriptions and shipped to the location of LAN 108A. The network administrator configures (206) DHCP server 120 with a correlation list of structure descriptions and for each structure description configures a corresponding client ID to be assigned to the device 102 matching the structure description. A separate list is optionally generated for each LAN 108, or each entry in the list includes an identification of the LAN 108 to which it relates.

In addition to the list, the network administrator optionally configures (208) DHCP server 120 with the IP address to be used for each of the client IDs. The devices 102 are installed (210) into their ports 104 and the devices automatically initiate a DHCP process (212) for requesting IP addresses and/or other configuration parameters, as described below with reference to FIG. 3.

In some embodiments of the invention, the correlation list of DHCP server 120 only includes entries for new devices that were not yet assigned IP addresses. Once the configuration of the new device was completed, the entry of the new device is removed from the list. Alternatively, each device 102 has an entry in the list, including devices that were previously configured. Thus, if at a later stage it is required to replace a client device 102 with a similar device, all that needs to be done is to insert the replacement device into its port 104, and possibly to any other port of the same network, and no configuration is required in DHCP server 120, which already has the previously entered entry for the device. In some embodiments of the invention, the previously configured information for the old device will generally apply also to the new device, as in these embodiments the configuration is not dependent on the MAC address of the device or on any other device specific information. In accordance with this alternative, two devices in the same LAN should not have the same structure description, so that the automatic configuration will not be confused.

In some embodiments of the invention, the configuration of a device 102 is independent of the port 104 in which the device 102 is inserted, provided it is in the designated LAN 108. Thus, the person inserting the device 102 into a port 104 is not required to identify into which port the device is inserted. Alternatively, the configuration of the device 102 depends at least partially on the port 104 in which it is located. For example, each list entry may be associated with a range of ports 104 of a LAN 108 rather than with the entire LAN.

Figure 3:
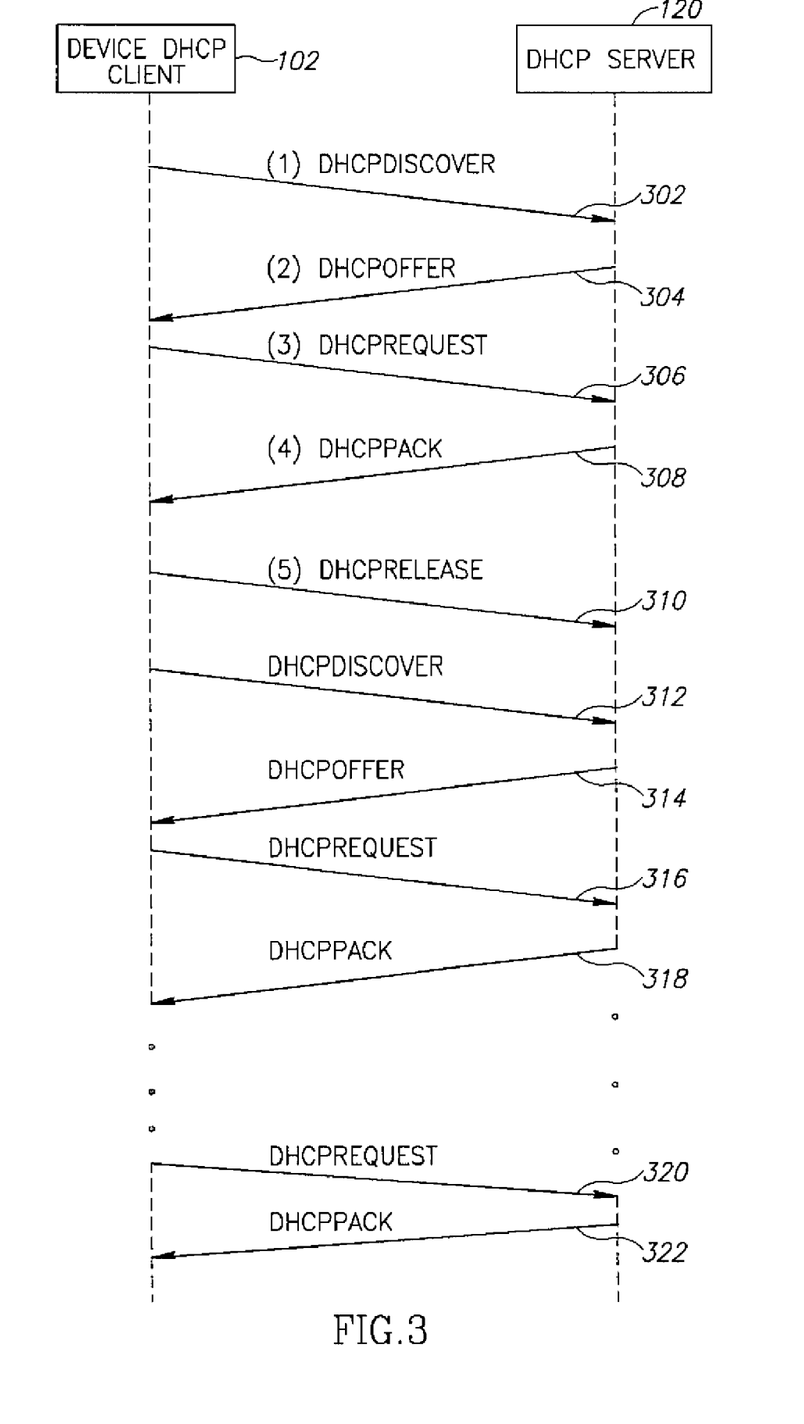
FIG. 3 is an exemplary message flow diagram, in accordance with an exemplary embodiment of the invention.

FIG. 3 is an exemplary signal chart of signals exchanged between a client device 102 and DHCP server 120 in a process of acquiring an IP address for the device, in accordance with an exemplary embodiment of the invention.

DHCP process 212 starts with client device 102 transmitting a DHCP discover packet 302, in search of DHCP server 120. In response, DHCP server 120 responds with a DHCP offer packet 304, identifying itself as a DHCP server. Client device 102 then transmits a DHCP request 306 in which it identifies itself as a device that requires a list of hardware descriptions and respective client IDs. The identification may include, for example, indicating that the device 102 belongs to a specific vendor, belongs to a specific network or belongs to any other group whose members require the list. DHCP server 120 responds with a DHCP acknowledgment (ack) packet 308 assigning an arbitrary IP address to client device 102 and including the list of hardware descriptions and respective client IDs configured into DHCP server 120 for the specific LAN 108. At this point, client 102 optionally releases the arbitrary IP address it was assigned, by transmitting a DHCP release packet 310, in preparation for asking for a static IP address.

Client 102 then transmits a second DHCP discover packet 312 and is responded again with a second DHCP offer packet 314, which identifies DHCP server 120 to client 102. Client 102 then transmits to DHCP server 120 a second DHCP request packet 316, this time identifying the IP address it is to receive using a client ID that corresponds to client 102, from the list received in DHCP ack packet 308, as discussed in detail below. DHCP server 120 responds to request packet 316 with the IP address configured for client 102 into server 120 and optionally with other configuration parameters. A configuration unit of client 102 self configures the client 102 with the received IP address and/or other received parameters, possibly using methods known in the art.

At a later time, when the assigned IP address is to expire, client 102 requests the same IP address again, using methods known in the art. For example, a request packet 320 identifies the IP address currently assigned to client device 102 and a response packet 322 acknowledges reassigning the packet. Alternatively, the IP address may be reassigned using the same method used in initially assigning the IP address, involving packets 302-318.

The time between receiving the first IP address in packet 308 and the second address in packet 318 is optionally short, possibly less than an hour, less than ten minutes, less than a minute or even less than half a minute.

Referring in more detail to generating (202) a structure description of a device 102, in some embodiments of the invention the structure description includes a model number of the device. Alternatively or additionally, the structure description includes a list of one or more of the sub-units (also referred to as modules) of the device, for example information on which module is located in each of one or more of the slots of a slotted device. Possibly, for modular devices, the description indicates the type or model of the chassis of the device. Further alternatively or additionally, the structure description includes an indication of the size of the device, the processor type or any other hardware description. In some embodiments of the invention, the structure description includes an indication of one or more software units carried by the device.

In some embodiments of the invention, a structure unit of device 102 is configured to self determine its structure and/or is configured with its structure when it is manufactured. Alternatively or additionally, device 102 includes a human interface, such as one or more jumpers, knobs, switches or buttons, which may be set by a human installer at the time of installation. The state of the human interface may be considered as part of the structure of the device and/or the information entered in the human interface may represent the structure of the device.

As an example, a sequence "Avaya.com/G350 & SAaxxx" may be used as a structure description of a device of the Avaya company having a model number G350 and a module of type "S" in its first slot, a module of type "A" in its second slot, a module of type "a" in its third slot and modules of type "x" in its fourth, fifth and sixth slots. In this example, type "A" may indicate an analog module, type "S" a server module, type "a" a MM710 module and type "x" may serve as a "don't care" indicator which matches all types of modules. In a particular implementation, a type "-" is used to indicate that a slot is empty.

It will be understood that substantially any other coding method, configured into devices 102, may be used in the generated hardware descriptions. Optionally, however, the coding method used for the structure descriptions has a relatively short notation, with each entry of the list requiring less than 256 bytes, less than 128 bytes or even less than 32 bytes, so that the list does not substantially add to the size of the DHCP packet 308 in which it is transmitted.

In an exemplary embodiment of the invention, the client IDs corresponding to hardware descriptions in the list are IP addresses. Alternatively, the client ID of a device is a unique number in the LAN of the device, which fits into the client identifier field of the DHCP protocol.

Optionally, the entries of the correlation list may include additional information beyond the hardware identification of the device and the respective client ID. For example, entries of the list may additionally include a password, password hash or other password identifier to be used in accessing DHCP server 120, an IP address of administrator console 122 and/or any other control station, and/or an ID of the VLAN on which the device is to operate.

In some embodiments of the invention, in selecting from the correlation list, a structure managing unit of client device 102 searches for a hardware description which completely matches its hardware configuration. Possibly, if two or more list entries that match the structure of client device 102 are found, one of the entries is selected randomly or otherwise arbitrarily. Alternatively, a better match is selected, for example a match which uses fewer wild cards. Further alternatively or additionally, an error message reporting the multiple matching entries is transmitted to the system administrator or otherwise provided. Possibly, instead of searching for a complete match, an entry which has a closest match to the configuration of device 102 is selected. Alternatively or additionally, a warning message is generated.

The structure and configuration units of client device 102 may be implemented using separate hardware or may be implemented as software running on a general purpose processor of client 102. The structure and configuration units may be implemented separately or together with other units or separately using any method known in the art.

In some embodiments of the invention, even when a list for a specific LAN 108 includes only a single member, the list is transmitted to the requesting client device 102 which selects whether to use the entry or not. In these embodiments, when the structure description for a device was not added to the list, a warning will be generated alerting the system administrator to correct the mistake. Alternatively, when only a single entry for a LAN was configured into DHCP server 120, the client ID is transmitted to the client device directly, avoiding the need to transmit the structure description.

It is noted that if it is not required to configure more than one device 102 in a single LAN 108 at any specific time, the list and structure descriptions are not required at all. Accordingly, in some embodiments of the invention, packet 308 does not include a list or a structure description, but rather merely provides a client ID to be used in request packet 316. The use of a double IP address request procedure, as described with relation to FIG. 3 is still advantageous, for example since it allows the server 120 to assign the client IDs, without going beyond the requirements of the DHCP protocol.

The DHCP server 120, in some embodiments of the invention, is a standard sever that operates according to the DHCP rules. Thus there is no need to change an existing DHCP server in order to implement these embodiments. Alternatively to implementing the invention using DHCP, the invention may be implemented using any other configuration protocol, such as a BOOTP. Possibly, server 120 is not configured to associate any meaning and/or to decipher the contents of the list, but rather merely serves as relay to client device 102 for what it considers as a meaningless sequence of bytes, which is configured into server 120 by a system administrator. Client device 102 is optionally configured by its manufacturer to use the relayed information.

Alternatively to DHCP server 120 transmitting the list to client device 102 in packet 308, client device 102 transmits its structure description to DHCP server 120, for example in packet 306. Server 120 may then immediately search the list, find the matching entry for the device and respond with the IP address configured into the server for the device. This alternative may require adapting server 120 to perform the search, as some currently available DHCP servers may not be adapted to perform such a search through a list.

The use of non-unique information on the client device 102, for example in a list of device descriptions transmitted from server 120 to device 102 in packet 308, is not limited to structure descriptions and can include other types of descriptions. In some embodiments of the invention, for example, the structure information is replaced by location information indicative of the room in which the device 102 is positioned and/or the location within the room. The location information may include, for example, a GPS reading, an altitude sensor value indicative of the floor on which the device is located and/or a user indication of a room number or other location information of the device. In a list based embodiment, server 120 transmits to client device 102, in packet 308, a list of locations of devices. A subsequent DHCP request optionally includes a client ID corresponding to a location determined by device 102 to be closest to its location.

In some embodiments of the invention, device 102 includes a human interface through which the device requests information required for configuration, such as a room number in which the device is located.

It is noted that the present invention is not limited to configuring IP addresses and may be used, in addition to configuring IP addresses of the various IFP versions (e.g., version 4, version 6), for configuring other addresses and other parameters. Furthermore, methods in accordance with some embodiments of the invention may be used to configure devices with parameters other than addresses. Optionally, methods in accordance with embodiments of the present invention may be used to assign various identification parameters (e.g., IP address, virtual LAN, credentials, domain name). It is noted that if desired, a device may be configured to use different identification values for different protocols. Alternatively or additionally, the methods of embodiments of the invention may be used to assign addresses of service providers the device is to use, such as a printer, email server, H.323 gatekeeper and/or proxy. Other parameters which may be configured include, for example setting of features and/or default values of fields of transmitted packets, such as whether to use quality of service (QoS) tags and which values to be used for the tags and/or other packet fields as a default.

In some embodiments of the invention, instead of having a plurality of devices 102 approaching DHCP server 120 for operation parameters, with each device having a separate entry in the DHCP server, devices requiring same parameters may approach server 120 with a same structure description and/or with a group ID of the devices that require the same parameters. This reduces the storage space for parameters required from server 120. For example, when a configured parameter is an address of a service providing unit, such as a proxy or H.323 gatekeeper, it may be desired to configure half the devices to approach one service providing unit and the other half of the devices to approach another. Rather than having for each device a different client ID, the devices may be assigned a group ID which is associated in DHCP server 120 with a specific set of parameters, for example addresses of service providers for which load balancing is required.

It will be appreciated that the above described apparatus may be varied in many ways, including, changing the layouts, materials, elements and structures used. The structure and configuration units of the client device as well as any other units of devices described above, may be implemented in hardware, software or a combination thereof. The units may be implemented separately, or may be implemented in a combined unit, which is only referred to differently according to the tasks it performs.

It should also be appreciated that the above described description of methods and apparatus are to be interpreted as including apparatus for carrying out the methods and methods of using the apparatus.

The present invention has been described using non-limiting detailed descriptions of embodiments thereof that are provided by way of example and are not intended to limit the scope of the invention. It should be understood that features and/or steps described with respect to one embodiment may be used with other embodiments and that not all embodiments of the invention have all of the features and/or steps shown in a particular figure or described with respect to one of the embodiments. Variations of embodiments described will occur to persons of the art.

It is noted that some of the above described embodiments describe the best mode contemplated by the inventors and therefore include structure, acts or details of structures and acts that may not be essential to the invention and which are described as examples. Structure and acts described herein are replaceable by equivalents which perform the same function, even if the structure or acts are different, as known in the art. Therefore, the scope of the invention is limited only by the elements and limitations as used in the claims. When used in the following claims, the terms "comprise", "include", "have" and their conjugates mean "including but not limited to".

The invention claimed is:

1. A method comprising:
   transmitting, from a network device to a server, non-unique information on the structure of the network device;
   receiving, by the network device from the server, a list with one or more entries that identifies the structure of other network devices, wherein receiving the list is in response to transmitting the non-unique information from the network device to the server;
   selecting, by the network device, an entry in the list that at least partly matches the structure of the network device, wherein the selected entry is transmitted to the server;
   receiving, by the network device from the server, parameter values in response to transmitting the selected entry to the server; and
   configuring the network device based on the parameter values.

2. The method of claim 1, wherein receiving the parameter values from the server comprises receiving a network address to be used as the network address of the network device.

3. The method of claim 2, wherein receiving the parameter values from the server comprises receiving an Internet Protocol (IP) address.

4. The method of claim 1, wherein the non-unique information comprises at least one of a model number of the network device and a sub-module of the network device.

5. The method of claim 1, wherein the non-unique information comprises a model number of a sub-module in a specific slot of the network device.

6. The method of claim 1, wherein each entry in the list includes a client identification that uniquely identifies a corresponding parameter value.

7. The method of claim 6, wherein each entry in the list includes at least one parameter in addition to a structure description and the corresponding client identification.

8. The method of claim 1, wherein receiving the list comprises receiving the list from the server.

9. The method of claim 1, wherein receiving the parameter values from the server comprises receiving the parameter values according to a dynamic host configuration protocol (DHCP).

10. A method comprising:
    receiving, by a server, non-unique information on the structure of a network device;
    transmitting, by the server to the network device, a list that includes one or more entries that identifies the structure of other network devices;
    receiving, by the server from the network device, a selection of an entry in the list that at least partly matches the structure of the network device; and
    transmitting, from the server to the network device in response to receiving the selection, parameter values for configuring the network device.

11. The method of claim 10, wherein the parameter values comprises an Internet Protocol (IP) address for configuring the network device.

12. The method of claim 10, wherein transmitting the parameter values to the network device comprises transmitting the parameter values in a dynamic host configuration protocol (DHCP) packet.

13. A method comprising:
    acquiring a plurality of devices of identical structure except for a different arrangement of sub-modules, so that the devices have different structure information;
    employing each acquired device in the plurality of devices in a network; and
    configuring each acquired device with a different set of parameters based on:
    (i) receiving, by a server, the structure information of each acquired device;
    (ii) transmitting a list from the server to each acquired device, wherein the list includes one or more entries that identifies the structure information of other network devices;
    (iii) receiving, by the server from each acquired device, a selection of an entry in the list that at least partly matches the structure information of each acquired device; and
    (iv) transmitting, from the server to each acquired device in response to receiving the selection, parameter values for configuring each acquired device.

14. A server, comprising:
    an input interface configured to receive from a network device:
    (i) a first packet, and
    (ii) a second packet; and
    a processor configured to:
    (i) determine, in response to the first packet, non-unique information on the structure of the network device;
    (ii) retrieve, in response to the first packet, a list that indentifies the structure of other network devices;
    (iii) determine, in response to the second packet, parameter values for configuring the network device, wherein the second packet includes a selection of an entry in the list that at least partly matches the structure of the network device; and
    (iv) generate, in response to the selection, a third packet that includes parameter values for configuring the network device.

15. The server according to claim 14, wherein the input interface is configured to receive the first packet and the second packet according to a dynamic host configuration protocol (DHCP).

16. A network device, comprising:
    a network interface configured to transmit and receive configuration protocol packets;
    a structure unit configured to:
    (i) generate and transmit to a server, an indication of the structure of the network device in response to receiving the configuration protocol packets, wherein the indication does not uniquely identify the network device;

(ii) select an entry from a list received from the server that at least partly matches the structure of the network device, wherein the list includes the structure description of other network devices;

(iii) generate an indication of the entry selected from the list for transmission to the server; and a configuration unit configured to receive the configuration protocol packets from the server, wherein receiving the configuration protocol packets is in response to the entry selected from the list, and wherein the configuration protocol packets include parameter values for configuring the network device.

17. A method comprising:

receiving, by a network device, a list that includes a plurality of device descriptions, wherein the plurality of device descriptions in the list includes non-unique information on the structure of other network devices;

selecting, by the network device, an entry from the list that at least partly matches the structure of the network device;

transmitting, from the network device to a server, a configuration request with an indication of the selected entry;

receiving, by the network device from the server, at least one parameter value in response to transmitting the indication of the selected entry; and configuring the network device based on the at least one parameter value.

18. The method of claim 17, wherein receiving the list by the network device comprises receiving a configuration protocol packet.

19. The method of claim 17, wherein transmitting the configuration request to the server comprises transmitting the configuration request within an hour of receiving the list.

20. The method of claim 17, wherein receiving the list by the network device comprises receiving the list from the server to which the configuration request is transmitted.

21. The method of claim 17, wherein receiving the at least one parameter value by the network device comprises receiving an address from the server, and wherein configuring the network device comprises configuring the network device using the received address as a source address of the network device.

22. The method of claim 17, wherein receiving the list by the network device comprises receiving the list in which each entry includes a location indication.

23. The method of claim 17, wherein selecting a single entry comprises selecting an entry whose device description best matches the network device, even if not completely matching.

24. A network device, comprising:

a network interface configured to transmit and receive configuration protocol packets; and a processor configured to extract from the configuration protocol packets received through the network interface, a list of a plurality of device descriptions for selecting a device description and, to transmit the configuration protocol packets requesting a configuration parameter that at least partly matches the selected device description;

wherein the plurality of device descriptions include non-unique information on the structure of other network devices.

25. The network device according to claim 24, comprising a human interface configured to receive information on the network device to be compared to the list, from a human operator.

26. The network device according to claim 25, wherein the human interface is configured to receive location information of the network device.

27. The network device according to claim 24, wherein the configuration protocol packet comprises DHCP.

* * * * *